Oct. 31, 1972  E. J. VON DER HEIDE  3,701,700
PROCESS FOR PRODUCING A CONTINUOUS NON-WOVEN FABRIC
Original Filed Dec. 28, 1966  4 Sheets-Sheet 1

*Elmer J. Von der Heide*

BY *Thomas W. Brennan*

Oct. 31, 1972   E. J. VON DER HEIDE   3,701,700
PROCESS FOR PRODUCING A CONTINUOUS NON-WOVEN FABRIC
Original Filed Dec. 28, 1966   4 Sheets-Sheet 2

*Elmer J. Von der Heide*

BY *Thomas W. Brennan*

United States Patent Office 3,701,700
Patented Oct. 31, 1972

3,701,700
PROCESS FOR PRODUCING A CONTINUOUS
NON-WOVEN FABRIC
Elmer J. von der Heide, Hudson, Ohio, assignor to
Thiokol Chemical Corporation, Bristol, Pa.
Original application Dec. 28, 1966, Ser. No. 605,346.
Divided and this application Aug. 5, 1970, Ser.
No. 61,411
Int. Cl. D05c 15/00
U.S. Cl. 156—72                                   6 Claims

ABSTRACT OF THE DISCLOSURE

A backing for non-woven fabric made from particulate thermoplastic material eliminates residual stress in thermoplastic backings. The fabric is produced by spreading particulate thermoplastic to a uniform depth, heating the thermoplastic until the particles are fused; applying face material to the thermoplastic, and then cooling the thermoplastic whereby the face material is locked therein. The yarn is applied to the backing from a rotating drum having peripheral pockets into which the yarn is inserted to form loops. After application of the yarn the fabric may be embossed or printed.

This application is a division of application Ser. No. 605,346, filed on Dec. 28, 1966 now abandoned.

This invention relates generally to fabric which is not woven but consists of face material embedded in a thermoplastic backing. Specifically, the invention relates to a fabric of continuous looped warp strands having their base roots embedded in a thermoplastic backing. The invention also relates to a method and apparatus for producing said fabric which principally can be used as carpet but is not limited to such use.

The conventional weaving process for manufacturing carpet is slow and costly. Generally, in the prior art, methods which eliminate weaving employ means for gathering the warp strands or face material into loops and means for adhesively securing the root portions of the strands to the carpet backing. The means for looping the warp strands can be grippers which gather and loop strands one against the other as they are secured to the backing, or the strands can be wound on a drum having peripheral pockets into which the strands are forced by vertically reciprocating fingers to form the tufts or loops. In some devices the pockets on the drum onto which the strands are wound may intermesh with teeth on an adjacent drum thus forcing the strands into the pockets. However, difficulty can be encountered in ensuring that the teeth do not clash and that the yarn is properly looped.

Instead of adhesively securing the warp loops to the backing the loops may be embedded in a molten or partially molten sheet of thermoplastic material as the material flows from an extruder or is heated and calendered. However, extruder sheet will necessarily be somewhat oriented, and as it cools and solidifies the extruded sheet will warp and fail to lie flat and smooth. Both extruded and calendered sheet also exhibit a tendency to creep. Therefore, it is an object of the present invention to provide a non-woven fabric with a thermoplastic backing that will lie flat and smooth and be dimensionally stable.

It is another object of this invention to provide a method of applying a thermoplastic backing to fabric yarn so that the backing has minimum residual stress.

It is a further object of this invention to provide an apparatus for producing carpet with a thermoplastic backing.

These and other objects are accomplished by the present invention in which a tufted fabric suitable for use as carpet is produced by distributing particulate thermoplastic material to a uniform depth; heating the particulate thermoplastic until the thermoplastic particles fuse together; applying a face material to the molten thermoplastic; and, cooling the thermoplastic whereby the face material becomes locked into the thermoplastic. While the steps of the invention may be performed by hand, a novel apparatus comprising means for accomplishing each step of the method in a continuous manner is shown in the accompanying drawings in which:

Figure 1:
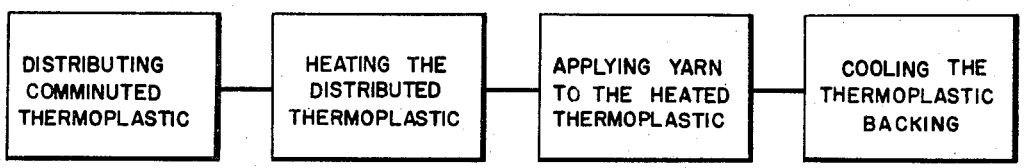
FIG. 1 is a block diagram showing the steps in the method of the subject invention.
Figure 2:
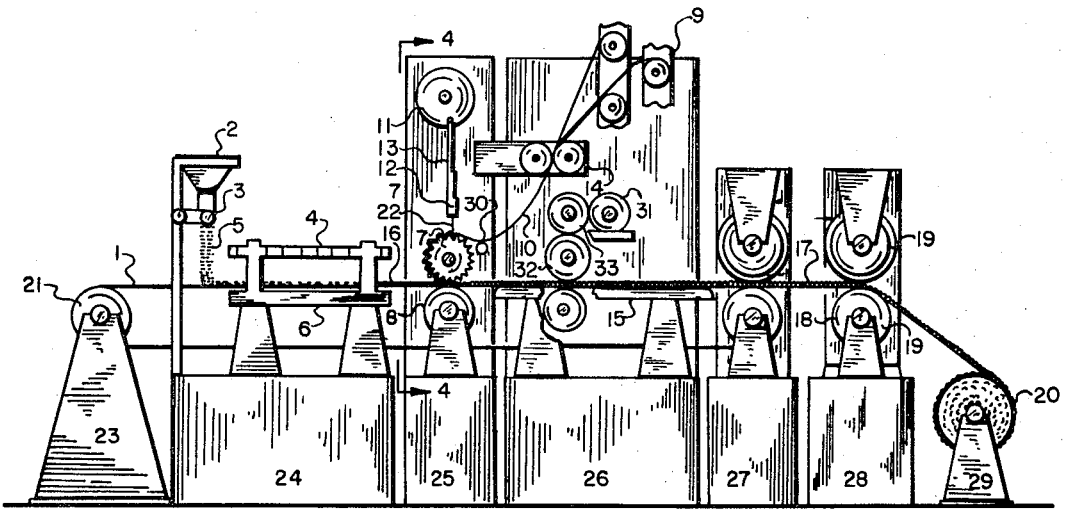
FIG. 2 shows a side view in perspective of a preferred apparatus for practicing the method of the invention.

Referring now to FIG. 2, a conveyor belt 1 is supported for movement between drums 18 and 21. Drum 18 serves as the conveyor drive. The conveyor belt 1 is used as the surface upon which the particulate thermoplastic material 5 is spread. The belt 1 should be of a thin, heat resistant material which is dimensionally stable, will not stretch, and is a reasonably good conductor of heat. A quite satisfactory belt is one constructed of glass fiber material and is 0.008 inch thick. The thickness of the belt is important because rapid heating and cooling of the thermoplastic backing is necessary and a relatively thin belt permits this.

Hopper 2 holds particulate thermoplastic material 5 which is shown being spread on belt 1 through the metered spreader 3. Any particulate thermoplastic material 5 may be used to form the backing and in the present apparatus a comminuted thermoplastic, ground polyethylene, was used. Other suitable materials include, but are not limited to, polymers of ethylene, polystyrene, polypropylene, polyamide (nylon), and granulated dry blends of polymers vinyl chloride. The term polymer as used herein includes homopolymers, copolymers, terpolymers, graft and block copolymers and the like. The significant point is that the material must be in particulate form before heating and fusing. If the backing material came from an extruder or from a calender it would have some orientation and residual stress with the result that the fabric would not lie smooth and flat nor would it be dimensionally stable.

The ground polyethylene should be spread to a uniform thickness on the belt 1. The thickness or depth should be at least 0.007 inch. Powders in the 5 mesh to 100 mesh range are preferable and a spreading concentration of up to 2 lbs./sq. yd. and greater may be used. For 50 mesh polyethylene the spreading density is about an ounce per square yard per mil thickness so that the minimum 0.007 inch thickness would be about 7 oz./sq. yd. in density.

After the ground polyethylene 5 is spread on belt 1 it passes under heating elements 4 and over heating elements 6 where it is heated sufficiently to fuse the thermoplastic particles together. For some thermoplastics fusing temperatures may be as low as 200° F. and for others it may be as high as 500° F. or more. The temperature is controlled by a thermostat (not shown) located at the level of belt 1 between the heating elements 6 and the looping wheel 7. As it is heated the thermoplastic goes from powder 5 to fused backing 16.

Yarn 10 is supplied from creel 9 through yarn feed rolls 14. The yarn hangs as a catenary between rolls 14 and comb 30. Comb 30 has teeth which keep the yarn strands separate as they are fed onto drum 7.

Figure 3:
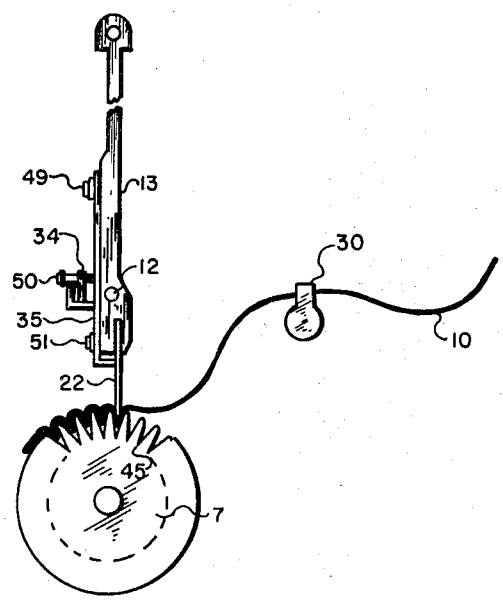
FIG. 3 is a side view of the looping drum and yarn inserter shown in FIG. 2.

In FIG. 3 the yarn 10 can be seen as it goes through comb 30 on to drum 7. Yarn inserter 13 pushes inserter blade 22 against the yarn 10 and into the slots or pockets 45. The yarn 10 is held in pocket 45 by the friction forces between the yarn and pocket wall. Clamp 35 is resiliently held by springs 34. The clamp tightly engages the yarn against the lands between pockets when blade 22 is inserted into the peripheral pocket 45. The clamping action prevents the yarn from being pulled out of the pockets as additional yarn is inserted.

Figure 4:
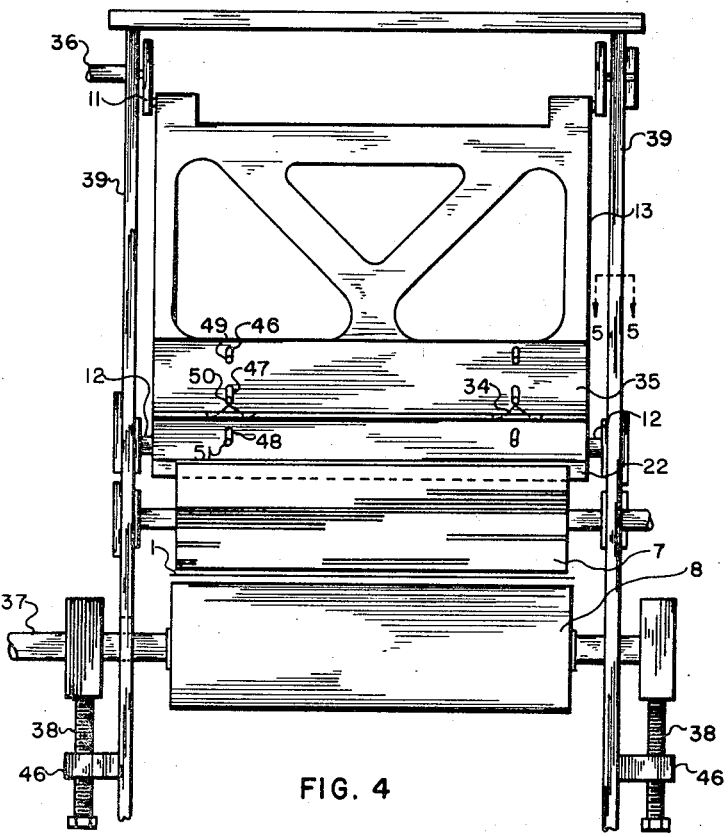
FIG. 4 is a view taken along line 4—4 of FIG. 2.
Figure 6:
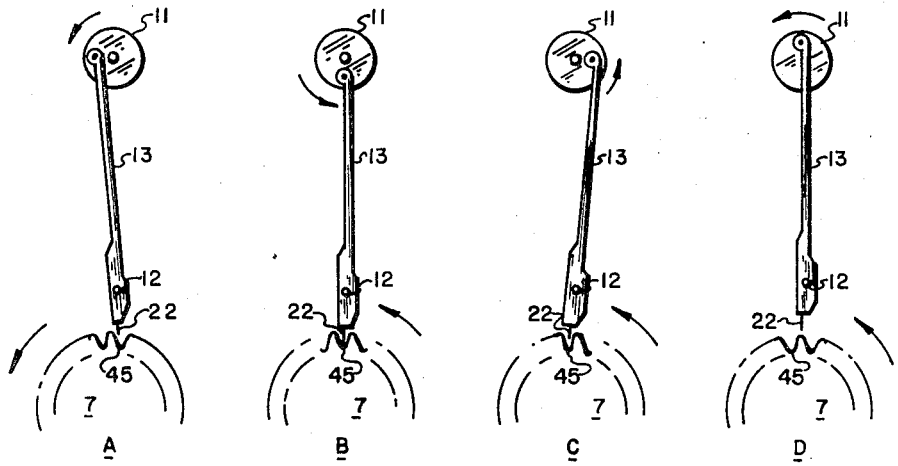
FIG. 6 is a schematic representation of the sequential operation of the yarn inserter.

By referring to FIG. 4 the operation of the yarn inserter and looping drum may be better appreciated. FIG. 4 is a view taken along line 4—4 of FIG. 2 and shows looping drum 7 with blade 22 inserted into one of the peripheral pockets. The vertically reciprocating motion of yarn inserter 13 is provided by its eccentric connection to crank 11. Rotary force is supplied to crank 11 by shaft 36. As the crank rotates inserter 13 is raised and lowered. The inserter 13 is restrained from horizontal motion at the point of flying pivot 12. The sequence of the insertion and withdrawal of the blade 22 through a complete cycle is given schematically in FIG. 6. Crank 11, yarn inserter 13, flying pivot 12 and drum 7 with pockets 45 is shown. In FIG. 6a the blade 22 is about to enter pocket 45. In FIG. 6b the crank 11 has turned a quarter of a revolution and blade 22 is fully inserted. Another quarter of a revolution to FIG. 6c brings the blade up and parallel to the sides of the pocket 45 so it may be withdrawn as the pocket rotates away. At FIG. 6d the blade 22 is fully withdrawn and the land of the pocket rotates beneath blade 22. The flying pivot 12 allows the blade 22 to move with the pocket as the blade is being inserted. A gear ratio must be maintained between drum 7 and crank 11 so that crank 11 rotates once for each pocket or slot 45 on the drum. For a drum 7 having 100 pockets crank 11 must ffIrotate 100 times for each drum 7 revolution or, in other words, a gear ratio of 100:1 must be maintained.

Figure 5:
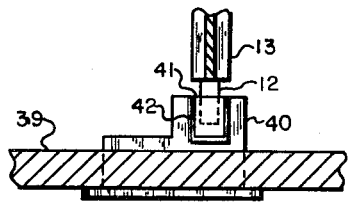
FIG. 5 is a view taken along line 5—5 of FIG. 4.

The operation of flying pivot 12 may be better understood by reference to FIG. 5 which is a section view taken along line 5—5 of FIG. 4. Supporting frame 39 holds inserter guide 40. Guide 40 is provided with a slide race 42 in which inserter slide 41 can move vertically. Pivot 12 fits into slide 41 and pivots therein. The ability of slide 41 to move vertically in race 42 allows the up and down motion of yarn inserter 13. The pivot 12 permits the swing of blade 22 as shown in FIG. 6.

Returning to FIG. 4 the assembled inserter, crank, and drums can be seen supported in frame 39. Pressure drum 8 can be vertically adjusted by turning bolts 38 in nuts 46. It is essential that the surfaces of drums 7 and 8 be parallel to each other, otherwise, the backing might vary in thickness as it passes between the two drums on belt 1.

The action of the yarn clamp 35 can be understood by viewing FIG. 3, FIG. 4, and FIG. 6. In FIG. 6b the inserter blade 22 is shown fully inserted. Here, the bottom of clamp 35 shown in FIG. 3 will engage the yarn 10 gripping it against the land of pocket 45 on drum 7. Clamp 35 is slidably mounted and can move up and down since nuts 49, 50, and 51 are placed in slots 46, 47, and 48 as shown in FIG. 4. Springs 34 return the clamp to its original position and, in addition, give resiliency to the grip of the clamp 35 against the yarn 10.

The pile height of the fabric can be controlled by the depth of the pockets 45 on drum 7, by the length of yarn inserter 13 or blade 22, or by the throw of crank 11. A pile of about 3/16 inch is a practical minimum pile height for a drum 7 having a 6 inch diameter. However, any drum diameter from about two inches upwards may be used as there is no theoretical limitation on the size of the drum.

Returning now to FIG. 2, after the backing 16 leaves drum 7 the yarn 10 is embedded in its partially molten surface thus forming fabric 17 which is cooled by plate coils 15. After being cooled the fabric 17 goes through windup pull rolls 19 and thence to windup roll 20.

Figure 7:
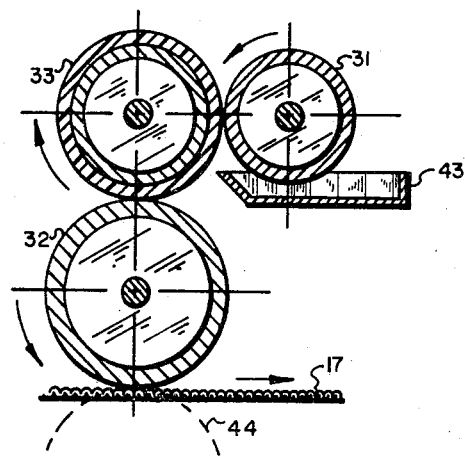
FIG. 7 is a section view of the printing and embossing rolls.

Referring now to FIG. 7, if printing or embossing of the fabric is desired then a pattern can be applied as the fabric moves along the belt 1 between pattern drum 32 and pressure drum 44. A pattern can simply be etched or cut into the face of drum 32 and for embossing the pressure of drum 44 can be adjusted so that the pattern is transferred into the fabric. At this point on the belt the thermoplastic backing is still soft and embossed patterns are formed by simply pushing the part of the pile which is to be lowered in a given pattern further into the backing. If printing is desired then ink tray 43 will be filled with ink so that supply drum 31 will dip into the ink pool and transfer ink to rubber or plastic coated inking roll 33. Inking roll 33 in turn transfers ink to the pattern roll 32 for printing. Printing and embossing can be done simultaneously with this arrangement.

The belt may be operated within a wide range of speeds, and good results may be obtained at lineal speeds between 3 and 8 ft./min. For startup, a low speed of about 1 ft./min. is necessary, and the maximum practical speed with a 6 inch looping drum appears to be about 13 ft./min. Heating and cooling rates will have to be adjusted according to the speed of the belt. The total length between drums 18 and 21 is about 47 feet for a 3 ft./min. operation. Higher speeds require longer heating and cooling sections.

Figure 8:
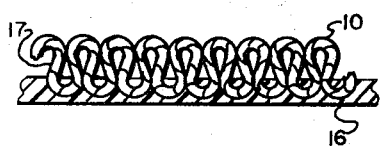
FIG. 8 is a cross-sectional view of the fabric produced according to the present invention.
Figure 9:
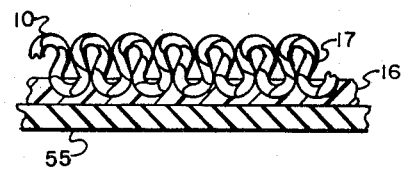
FIG. 9 is a fabric according to the present invention having a rubber backing; and, FIG. 10 is a perspective view ilustrating the tufted appearance of the fabric.
Figure 10:
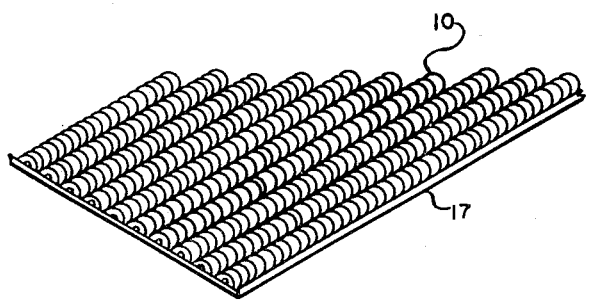

The yarn 10 may be wool, cotton, nylon, polypropylene, acrylic, polyester, or other synthetic yarns. Actually, any fiber, natural or synthetic may be used. A section through the finished fabric may be seen in FIG. 8. The loops of yarn 10 partially penetrate backing 16 and are locked therein. In FIG. 10 a perspective view of the fabric 17 may be seen showing the rows of yarn 10 which give the fabric 17 its tufted appearance.

The invention is not limited to looped yarn face material as any fabric could be gathered in loops and applied to the fused thermoplastic backing to give the resulting material an undulating appearance. A flocked fabric may be produced where the material forming the flock is embedded in the fused particulate thermoplastic backing.

Also, the invention is not limited to a single sheet of backing material. In FIG. 10 a cross-sectional view of the looped fabric is shown with the thermoplastic 16 fused to cellular rubber backing 55. In the method for making the fabric the particulate thermoplastic can be spread uniformly on cellular rubber sheet before heating. Besides rubber, any foam material could be used as padding. Even a cold calendered sheet of vinyl stock, containing a blowing agent, could be used. This material will "blow" forming a cellular stock, in heating zone, 4 and 6.

If added strength in the backing is desirable then the particulate thermoplastic could be spread on glass fiber or other suitable material, and the fiber and the thermoplastic will bond on heating. The added strength is useful where it is necessary to join two separate pieces of fabric by splicing. Good splices can be achieved with the thermoplastic backing thus further lending to its usefulness.

Having described the invention, I claim:

1. A method for producing a non-woven, tufted appearing fabric comprising the steps of;
   (a) spreading upon a moving glass fiber conveyor belt, a thermoplastic particulate polymer selected from the group consisting of polyethylene, polypropylene, polyamide, polystyrene, dry blends of polyvinyl chloride and mixtures of said polymers, said belt having a maximum thickness of about 0.008", said particulate polymer being spread on said belt to a substantially uniform depth of at least 0.007" and of a fineness mesh in the range of from 5 to 100 and being spread on said belt in a condition such that the concentration thereof ranges from 1 ounce per square yard to about two pounds per square yard;

(b) conveying said spreaded polymer to a heat zone having a temperature ranging from 200° F. to about 500° F.;

(c) passing said polymer in said heat zone at a rate sufficient to cause said material on said belt to fuse forming a backing;

(d) inserting loops of face yarn into said fused backing to form a pile or face fabric; and, (e) rapidly cooling said fabric to solidify said backing to lock said pile or face yarn thereinto resulting in a tufted appearing face pile yarn fabric.

2. The fabric of claim 1 further including the step of spreading said fuseable polymer on a secondary solid sheet backing on said conveyor belt prior to conveying said polymer to said heat zone.

3. The fabric of claim 2 wherein the secondary solid sheet is cellular rubber and the fuseable polymer when fused and cooled adheres to said secondary sheet.

4. The fabric of claim 2 wherein the secondary sheet is a foamed vinyl sheet formed by a blowing agent which is actuated by the heat in said heat zone to form said foamed sheet.

5. The fabric of claim 2 wherein the secondary sheet is glass fiber which bonds to said fuseable thermoplastic particulate polymer backing upon cooling thereof.

6. The fabric of claim 2 wherein said polymer of said fused backing is polyethylene.

References Cited
UNITED STATES PATENTS

| | | | |
|---|---|---|---|
| 2,638,959 | 5/1953 | Johnson | 161—66 |
| 3,525,662 | 8/1970 | Padgett et al. | 156—72 X |
| 3,325,323 | 6/1967 | Forkner | 156—72 |
| 3,376,178 | 4/1968 | McAlpine | 156—72 |

WILLIAM A. POWELL, Primary Examiner

U.S. Cl. X.R.

156—210, 306, 435; 161—66, 67